United States Patent [19]

Flament

[11] Patent Number: 5,277,385
[45] Date of Patent: Jan. 11, 1994

[54] METHOD OF ATTITUDE REACQUISITION FOR THREE-AXIS STABILIZED SATELLITES USING STAR RECOGNITION

[75] Inventor: Patrick Flament, Le Cannet, France

[73] Assignee: Aerospatiale Societe Nationale Industrielle

[21] Appl. No.: 806,155

[22] Filed: Dec. 12, 1991

[30] Foreign Application Priority Data

Dec. 12, 1990 [FR] France .................... 90 16151

[51] Int. Cl.⁵ .................................... B64G 1/36
[52] U.S. Cl. .......................... 244/164; 244/171
[58] Field of Search ............ 244/164, 171; 364/455, 364/459

[56] References Cited

U.S. PATENT DOCUMENTS

5,080,307 1/1992 Smay et al. .................. 244/164

FOREIGN PATENT DOCUMENTS

0174715 3/1986 European Pat. Off. .
0388687 10/1989 European Pat. Off. .
0363243 4/1990 European Pat. Off. .
2008284 5/1979 United Kingdom .

Primary Examiner—Michael S. Huppert
Assistant Examiner—Anne E. Bidwell
Attorney, Agent, or Firm—Remy J. VanOphem

[57] ABSTRACT

To reacquire the attitude of a satellite wholly or partially stabilized on three axes a test is executed to determine if a terrestrial sensor is sensing the Earth (test 1) and if a star sensor is sensing a star whose magnitude is at least approximately equal to that of a given reference star (test 2).

* Phase a. If the results of tests 1 and 2 are positive, the Earth and the star are captured and the consistency of roll information supplied by the Earth and star sensors is checked: if the information is not consistent phase (b) is carried out.
* Phase b: If the results of test 1 only is positive, the Earth is captured and the satellite is caused to rotate in yaw until the result of test 2 is positive. The reference star is captured and the phase (a) consistency test is carried out.
* Phases c and d: If the result of test 1 is negative, the pitch speed is reversed for at most a given time. If the result of test 1 becomes positive, test 2 is carried out. If the result of test 2 has remained negative, phase (b) is carried out. Otherwise the consistency test is carried out. Failing any result, Sun acquisition mode is selected.

15 Claims, 3 Drawing Sheets

METHOD OF ATTITUDE REACQUISITION FOR THREE-AXIS STABILIZED SATELLITES USING STAR RECOGNITION

BACKGROUND OF THE INVENTION

1. Field of the invention

The present invention concerns a method of saving a wholly or partially three-axis stabilized satellite, in other words an attitude reacquisition procedure for returning the satellite or the relevant part thereof to its nominal service attitude.

2. Description of the prior art

The three axes with reference to which the attitude of a satellite (or part of a satellite) is stabilized are an axis directed towards the Earth, usually called the yaw axis Z, an axis perpendicular to the plane of the orbit, usually called the pitch axis Y, and an axis perpendicular to the first two usually called the roll axis X. These axes together form a direct trihedron (X, Y, Z). In the case of an equatorial or near-equatorial orbit, the pitch axis Y is at least approximately parallel to the NORTH-SOUTH direction and if the orbit is a circular, geostationary orbit, the roll axis is tangential to the orbit and in the same direction as the instantaneous speed vector of the satellite in its orbit.

The invention is aimed at any satellite in terrestrial orbit using at least one terrestrial sensor to measure roll and pitch angles and a star sensor to measure roll and yaw angles. There is therefore redundancy in respect of the roll measurement.

Satellites wholly or partially stabilized on three-axes in practice have:
- a fixed kinetic moment near Y achieved by a pitch momentum wheel or by rotation of part of the satellite, for example, or
- an orientable kinetic moment near Y with one degree of freedom provided by, for example, a pitch momentum wheel and a yaw reaction wheel or two momentum wheels in a V configuration about the pitch axis and a yaw reaction wheel or a single momentum wheel on a single-axis pivot in the roll-/yaw plane, or
- an orientable kinetic moment near Y with multiple degrees of freedom provided, for example, by a single momentum wheel on multiple pivots in the plane, or
- a weak (possibly null) kinetic moment of any orientation provided by, for example, three reaction wheels.

Satellite attitude control concepts using a terrestrial sensor and a star sensor are already known and form the subject matter of the patent FR-2.522.614 (inventors Guy MOUILHARAT, Paul A. DUCHON, Jean-Michel A. GUILBERT and André A. ROLFO of the CENTRE NATIONALE D'ETUDES SPATIALES) for an "Equatorial orbit satellite configuration with improved solar means" and the patent FR-2.637.565 (inventor Patrick MAUTE of AEROSPATIALE) for a "Three-axis active control system for a geostationary satellite".

The patent FR-2.522.614 concerns a satellite having a platform stabilized to face the Sun using measurements provided by a solar sensor and a star sensor and a payload rotatable about a NORTH-SOUTH axis relative to the platform and stabilized to face the Earth using measurements provided by a terrestrial sensor. The solar and stellar sensors on the one hand and the terrestrial sensor on the other hand are therefore involved in separate stabilization of separate parts of the satellite. There is no particular provision for saving the mission in the event of loss of attitude.

The document FR-2.637.565 describes various attitude control modes (normal mode, station-keeping mode, survival mode and apogee maneuver mode) using terrestrial, solar and stellar sensors. The survival (or save) mode entails pointing a given axis in the roll-/yaw plane towards the Sun.

The use of a star sensor to shorten nominal attitude reacquisition by a three-axis stabilized satellite following a fault condition has also been considered in the patent EP-0.338.687 (inventor Nicholas F. MATTHEWS of BRITISH AEROSPACE) for a "Method of and apparatus for returning an earth orbiting spacecraft to an earth pointing attitude after displacement therefrom"; reacquisition is obtained from a configuration in which the satellite is pointed at the Sun, as in the document FR-2.637.565.

The conventional attitude reacquisition procedure for three-axis stabilized satellites is as follows:
- the kinetic moment is cancelled by braking the wheels,
- Sun pointing mode is selected,
- Earth pointing mode is selected,
- the wheels are run up to speed.

The Sun pointing mode entails searching the Sun and then pointing one of the satellite axes towards the Sun and causing the satellite to rotate slowly (typically at 0.5°/s) about this axis. The axis pointed towards the Sun is generally chosen so that the Sun illuminates the solar panels to generate electrical power for the satellite so that its equipment functions correctly. This enables the satellite to remain in this attitude for long periods without risk of damage, although the mission is obviously interrupted. The rotation axis chosen is therefore usually different from the kinetic moment axis, so that it is necessary to cancel the kinetic moment of the satellite before activating this mode. Otherwise the precession imposed on the kinetic moment would require frequent thruster operations and therefore unacceptable consumption of propellant.

The Earth pointing mode entails searching the Earth by rotating the satellite about a satellite axis directed towards the Sun; this axis is in practice different from the Sun pointing mode axis and is chosen so that the field of view of the Earth sensor must intercept the Earth. Once the Earth has been captured, the satellite may be rotated about the yaw axis to return it to its reference attitude.

When this type of procedure is used satellite attitude reacquisition takes at least an hour and may take several hours, even several tens of hours, if attitude is lost in an area of the orbit where it is not possible to have the Sun and the Earth simultaneously in the fields of view of their respective sensors or if a decision by the satellite control station personnel is delayed.

This type of method, routinely used for its simplicity of concept and its reliability, is the subject matter of the document FR-2407860 inter alia in which:
- the reacquisition time is from one to eight hours minimum;
- the procedure for capturing the Earth encompasses the followings stages: the wheels are stopped to cancel the kinetic moment, the satellite is rotated about the X axis to search the Sun, the satellite is rotated about the Y axis until the Sun faces +X, the satellite is rotated about the X axis facing the Sun pending the command to search the Earth (at this stage the sequencing is done manually from the ground and the reacquisition time depends on how soon the appropriate decision is taken by the ground personnel), the satellite is rotated about an intermediate axis facing the Sun, the satellite may be rotated about the Z axis, depending on its position in its orbit and the sensors used, and the wheels are run up to speed by manual sequencing; and no star sensor is provided.

In order to reduce the reacquisition time the patent FR-2649809 proposes to start from the Sun pointing mode and to search the Earth using measurements provided by an additional solar sensor. This procedure enables reacquisition by using the Sun pointing mode at any point in the orbit so as to limit its duration to about one hour provided that the personnel of the satellite control station is available.

An identical result is achieved by the patent EP-0338687 which uses a star sensor. This patent proposes to search the star using the same procedure as is used to search the Earth in the patent FR-2407860. As in the patent FR-2649809, the benefit is that Earth acquisition can be carried out anywhere in the orbit. In these two cases the procedure for searching the Earth can only be undertaken from the Sun pointing mode.

Unlike these three patents, the invention proposes to carry out reacquisition faster (15 to 30 minutes maximum instead of one hour minimum), automatically (no action is required of the ground personnel to load into the onboard software the rotation axis used to capture the Earth or the star), without using a solar sensor, without manual action from the ground to sequence the reacquisition process, with no complicated star recognition algorithm, and avoiding the need to cancel the kinetic moment and so minimizing the consumption of propellant (the wheels continue to rotate at the same speeds, so that it is not necessary to use the thrusters to counter the torque from the wheels when they are braked and then run up to speed again).

Fast reacquisition concepts economical in propellant have been used on satellites having no star detector. Mention may be made of the TVSAT/TDF series or the patent FR-2.620.243 (inventor Ernst BRUDERLE of MESSERSCHMITT-BOLKOW-BLOHM GmBh) for a "Method of reacquisition of the pitch position of a terrestrial satellite"; however, as the title indicates, this process is limited to reacquisition of the attitude of the satellite in the roll/yaw plane only, it being assumed that the orientation of the pitch axis has remained correct.

An object of the invention is to provide a satellite adapted to be three-axis stabilized with an automatic save mode (requiring no action from the ground) which makes it possible in most cases of loss of attitude (not just in the roll/yaw plane) to return the satellite to its nominal attitude within a much shorter time (typically less than thirty minutes) than the prior art methods, with no significant penalty in terms of cost, mass or reliability and requiring only a moderate consumption of propellant. The invention is, therefore, directed to a fast attitude reacquisition procedure which has a sufficiently high probability of success that the risk of having to use an intermediate attitude in which the satellite is pointed towards the Sun (a procedure that is costly in terms of time and/or propellant) becomes negligible in practice.

SUMMARY OF THE INVENTION

The present invention resides in an attitude reacquisition method for a satellite, at least part of which is stabilized about roll, yaw and pitch axes and is equipped with at least roll, pitch and yaw speed sensors, a terrestrial sensor and a star sensor adapted to sense a reference star of known position and magnitude, wherein, after loss of attitude is confirmed a test is executed to determine if the terrestrial sensor is sensing the Earth (test 1) and if the star sensor is sensing a star of magnitude at least approximately equal to the known magnitude of the reference star (test 2).

Phase a: if the results of tests 1 and 2 are positive, the satellite attitude is controlled in roll, yaw and pitch to capture the Earth and the star and the roll information supplied by the Earth and star sensors is tested for consistency. If the result of the consistency test is positive a normal attitude control mode is selected; if not, processing continues with phase (b) set forth below.

Phase b: if the result of test 1 is positive and the result of test 2 is negative the attitude of the satellite is controlled in roll and in pitch to capture the Earth and the satellite is caused to rotate about the yaw axis until the result of test 2 is positive; the attitude of the satellite is controlled to capture the star and the consistency test of phase (a) is carried out.

Phase c: if the result of test 1 is negative and the result of test 2 is positive, the attitude of the satellite is controlled in roll and yaw to capture the sensed star and the pitch rotation speed is reversed for at most a given time; if the result of test 1 is then positive, the attitude of the satellite is controlled to capture the Earth and the star and the consistency test of phase (a) is carried out; if the result of test 1 is not positive at the end of the given time, Sun acquisition mode is selected.

Phase d: if the results of tests 1 and 2 are negative the roll and yaw speeds are cancelled and the pitch speed is reversed for at most a given time; if the result of test 1 becomes positive test 2 is run; if the result of test 2 remains negative the phase (b) processing continues; otherwise the consistency test of phase (a) is carried out; if the result of test 1 is not positive at the end of the given time, Sun acquisition mode is selected.

In this context the expression "capture" refers to control of the attitude of the satellite adapted to return the Earth or the star to its nominal position in its sensor.

According to other optionally combinable features of the invention the reference star is less than 40° from the normal to the orbital plane; the reference star has a magnitude specific to it the reference star is the same throughout the mission of the satellite; the reference star is selected from a predetermined star group to suit an individual mission or the orientation of the satellite; the reference star is chosen in the NORTHERN hemisphere; the reference star is Pole Star; the reference star is chosen in the SOUTHERN hemisphere; the reference star is CANOPUS; the satellite is in an orbit inclined at not more than 15° to the plane of the Equator; and the orbit of the satellite is geosynchronous or heliosynchronous.

Objects, features and advantages of the invention will emerge from the following description given by way of non-limiting example only with reference to the appended drawings.

DETAILED DESCRIPTION OF THE INVENTION

Any satellite in orbit about the Earth has a direct orthonomic frame of reference Xi Yi Zi whose axes are fixed with respect to inertial space with Xi directed towards the vernal point $\gamma$, Zi towards geographical North and Yi completing the trihedron, for example.

Figure 1:
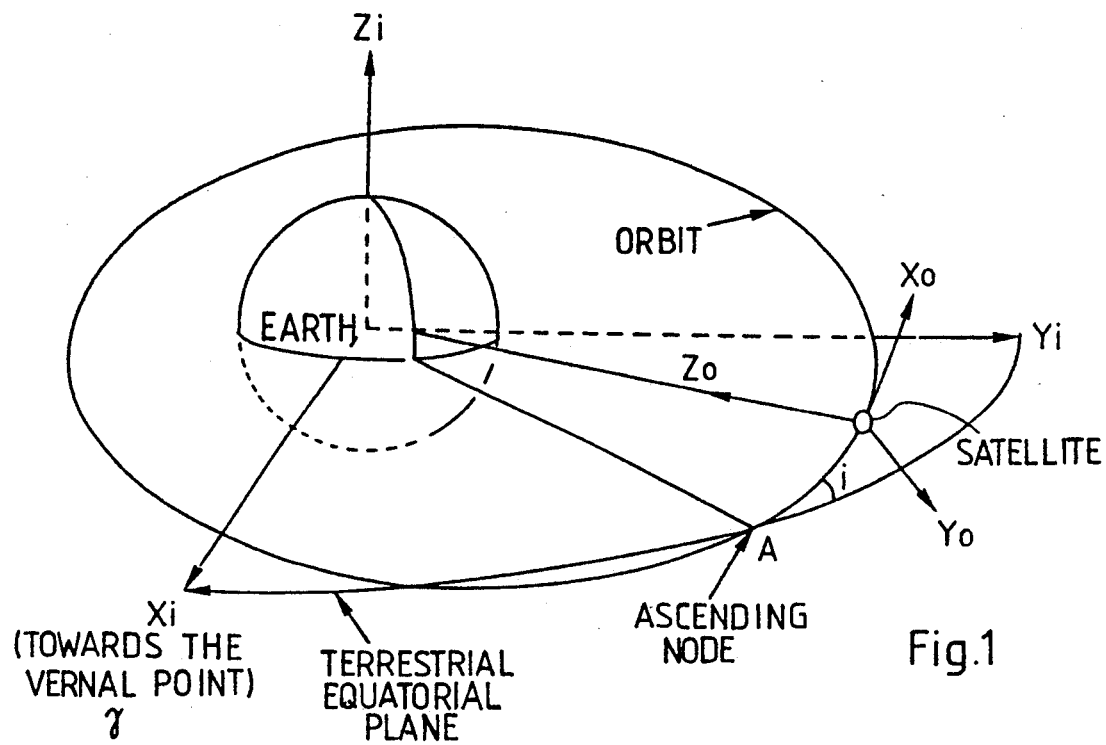
FIG. 1 is a diagram illustrating the concepts of an inertial frame of reference (Xi, Yi, Zi) and an orbital frame of reference (Xo, Yo, Zo)

A so-called local orbital frame of reference Xo Yo Zo at the center of mass of the satellite has Zo directed towards the center of the Earth, Yo parallel to the negative normal to the orbital plane and Xo completing the trihedron and directed towards the same side as the linear speed vector in the orbit. FIG. 1 shows the geometry of the frames of reference (Xi Yi Zi) and (Xo Yo Zo) in the case of a satellite in near-Equatorial (typically 10° or less inclination) terrestrial orbit.

Figure 2:
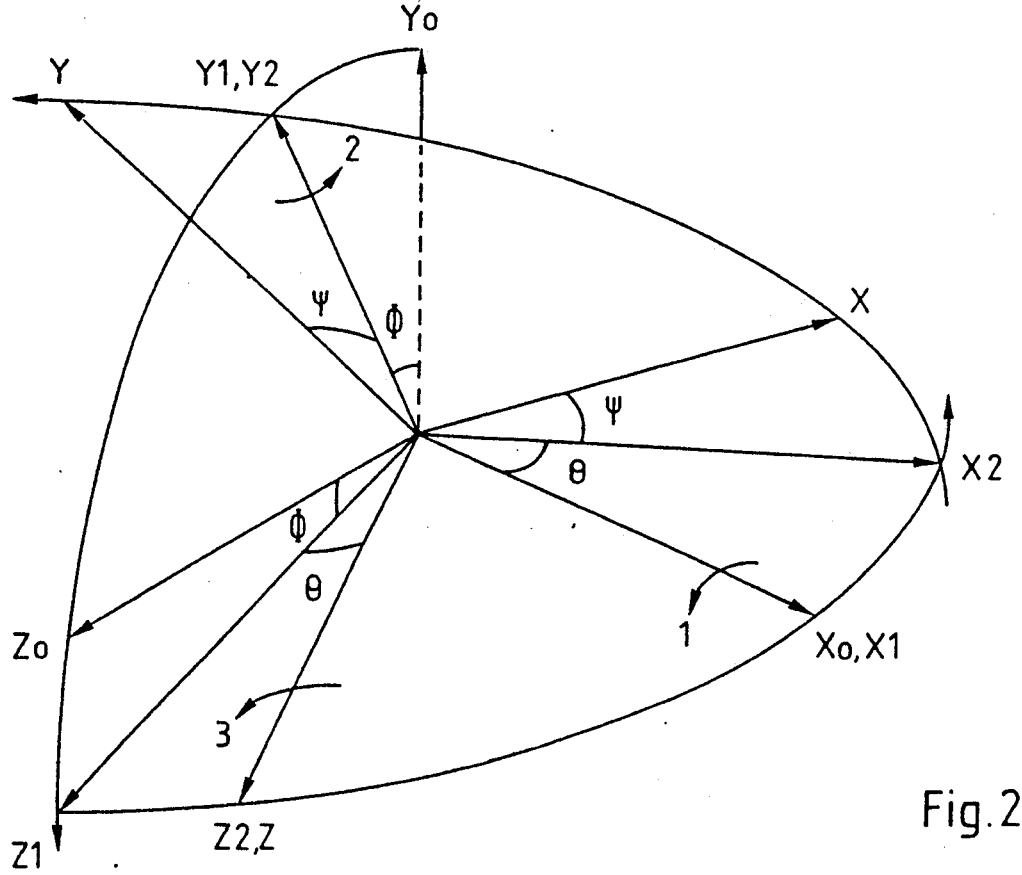
FIG. 2 is a diagram illustrating the concepts of roll, pitch and yaw.

The satellite is stabilized on three axes (hence the expression "three-axis stabilized satellite") by maintaining a frame of reference X Y Z related to the satellite as close as possible to the "reference" frame of reference Xo Yo Zo. Three angles phi $\Phi$, theta $\Theta$ and psi $\Psi$ define the instantaneous position of the satellite frame of reference X Y Z relative to the frame of reference Xo Yo Zo, as shown in FIG. 2, for example.

The standard terminology and conventions are as follows: $\Phi$ is called the roll angle and represents the pointing error about the reference axis Xo; $\Theta$ is called the pitch angle and represents the pointing error about the reference axis Yo; $\Psi$ is called the yaw angle and represents the attitude error about the reference axis Zo; X is called the roll axis; Y is called the pitch axis; and Z is called the yaw axis.

Figure 3:
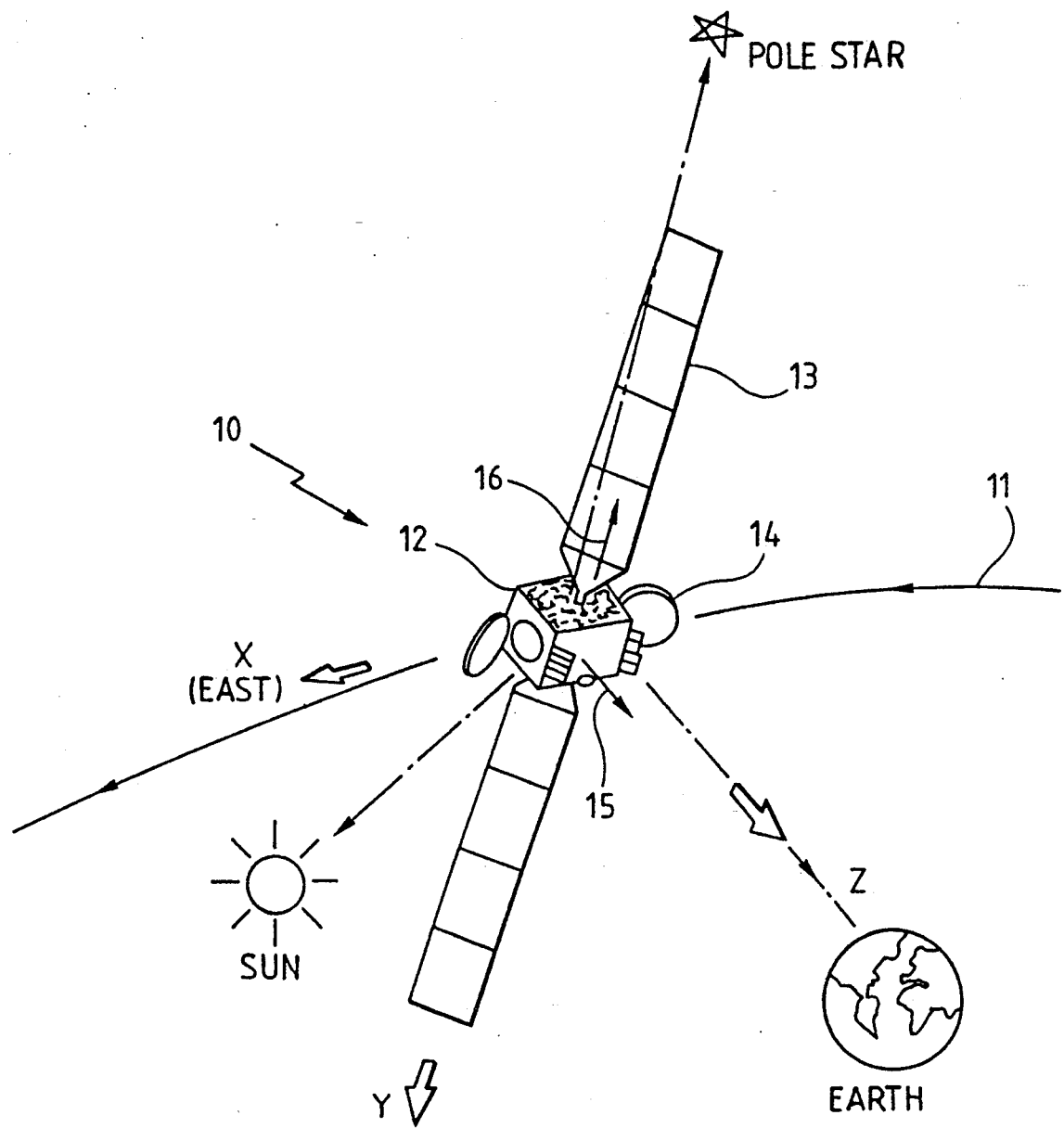
FIG. 3 is a diagrammatic view of a satellite in its orbit.

FIG. 3 is a diagram showing a satellite 10 in an orbit 11 and conventionally including a satellite body 12, a solar generator 13, equipment (antennas, etc) 14, a terrestrial sensor symbolically represented by the arrow 15 and a stellar sensor or star sensor 16 on the NORTH face of the satellite body so that it can sense the Pole Star. In an alternative embodiment, not shown, the stellar sensor may be pointed towards the South so that it can sense the star CANOPUS, for example. The general structure of the satellite will not be described in any further detail as it does not form any part of the invention.

In the example under consideration the satellite further includes rate gyros (not shown) adapted to measure the speed of rotation of the satellite about the roll, pitch and yaw axes.

The terrestrial sensor 15 measures the roll and pitch angles.

The star sensor 16 enables roll and yaw angles to be calculated. This generally requires pitch angle information which can be obtained either from the terrestrial sensor or by integrating information from the Y axis rate gyros.

Figure 4:
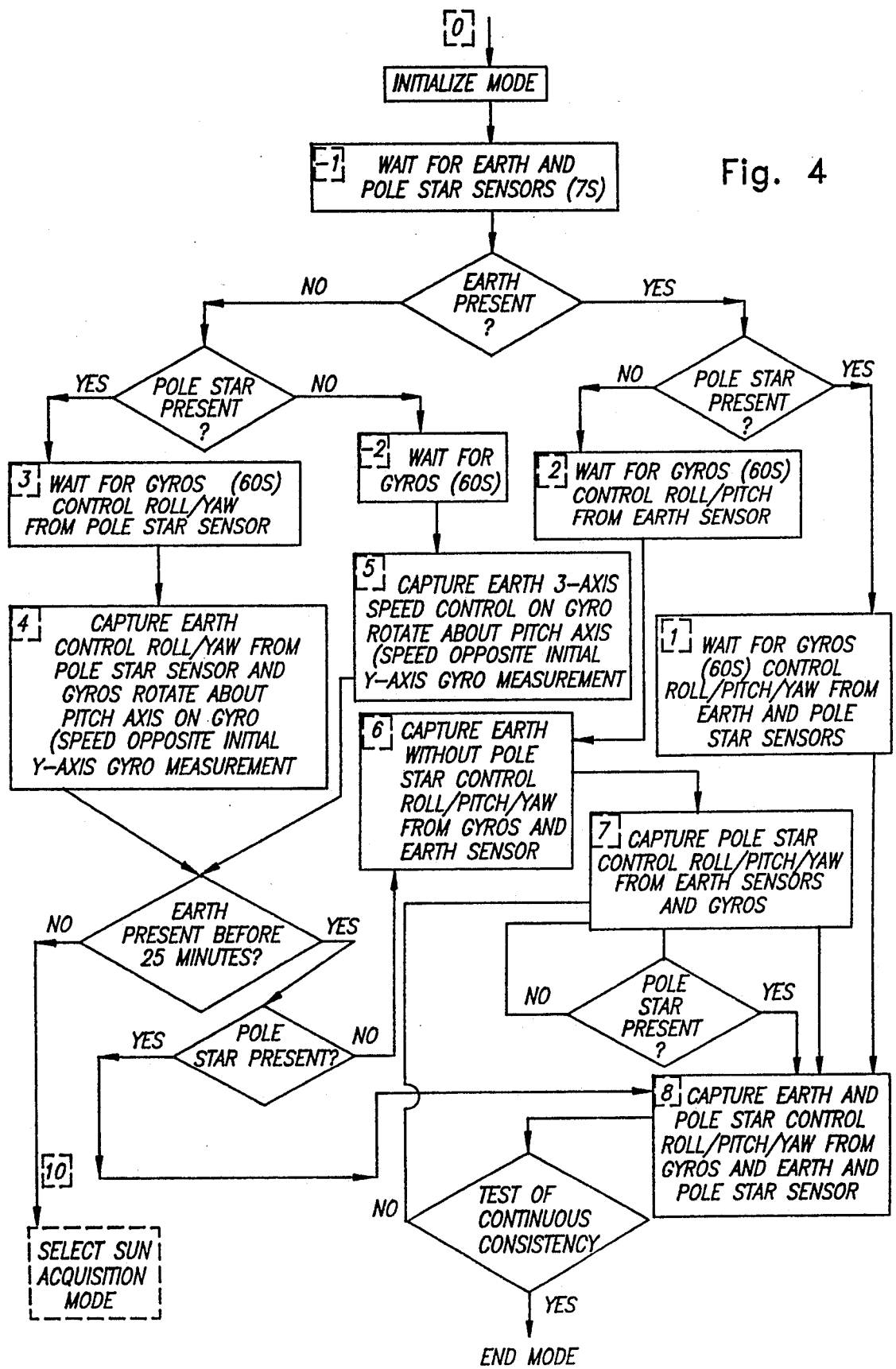
FIG. 4 is a flowchart of one save mode in accordance with the invention.

Assume that following a malfunction of any kind the satellite attitude has been lost. The reacquisition logic shown by way of example in FIG. 4 shows how the reacquisition operations can be sequenced, either automatically or manually. After activating the relevant sensors (Earth, star, rate gyros, etc) if necessary (block —1) a test is executed to see if the sensor 15 is sensing the Earth and if the sensor 16 is sensing a star having the same magnitude as the reference star (in this example the Pole Star); there are four possible outcomes:

a) the Earth and a star having the required magnitude are in the field of view of their respective sensor; in this case the following operations are carried out:

the angles are actively controlled (block 1): roll angle on the basis of information from the Earth (or star) sensor, pitch angle on the basis of information from the Earth sensor and yaw angle on the basis of information from the star sensor;

verification that the observed star (which has the required magnitude) is the reference star by verifying (block 8) the consistency of the roll measurements respectively deduced from the Earth and star sensor measurements (block 8); although the roll measurements from the two sensors may temporarily appear consistent, if the star observed is not the reference star, this consistency will rapidly disappear (within a few minutes in the case of a geostationary satellite) as the satellite continues to rotate in its orbit, which modifies the geometry of the triangle delimited by the Earth, the satellite and the reference star; if this consistency is maintained (over five minutes, for example), it is assumed that the attitude has been reacquired;

if the consistency check shows that the star under observation is not the reference star, a decision is taken to continue the star capture phase described below;

b) the Earth is in the field of view of its sensor and the reference star is not in the field of view of its sensor (either there is no star of the required magnitude or phase (a) has shown that this star is not the correct one); in this case, the following operations are carried out:

active control (block 2) of the roll and pitch angles based on information from the Earth sensor and zeroing (block 6) of the yaw rotation speed measured by the yaw rate gyro;

reference star capture (block 7) (if not captured since the start of phase (b)); there are two ways to conduct this capture procedure:

satellites with weak kinetic moment of any orientation: the satellite is caused to rotate about the yaw axis in the reverse direction to the observed initial speed; immediately a star of comparable magnitude to the reference star appears in the field of view of the sensor, the satellite is pointed in yaw at this star, and the star is identified using the method described above for phase (a);

satellites with kinetic moment near the pitch axis Y: the satellite is caused to rotate about the yaw axis, the direction of rotation being determined by the sign of the roll error; on a satellite with a kinetic moment near Y the kinetic moment remains fixed in an inertial frame of reference whereas the local orbital frame of reference rotates at the rate of one revolution per orbit; a yaw error is therefore converted into a roll error as the satellite rotates in its orbit and the roll error detected is representative of the yaw error if it is high; immediately a star of comparable magnitude to the reference star appears in the field of view of the star sensor, the satellite is pointed in yaw at this star, and the star is identified by the method described above for phase (a);

c) a star is in the field of view of its sensor and the Earth is not in the field of view of its sensor; in this case the following operations are carried out:

the roll and yaw angles are controlled (block 3) according to information from the star sensor and the pitch rotation speed measured by the pitch rate gyro is zeroed (block 3);

Earth capture (block 4) (if not captured since the start of phase (c)) by rotation of the satellite about the pitch axis in the opposite direction to the observed initial speed; immediately the Earth appears in the field of view of the sensor, the satellite is pointed in pitch at the Earth, and the observed star is identified by the method described above for phase (a);

d) neither the Earth nor any star is in the field of view of their sensor; in this case the following operations are carried out (block 5):

the roll, pitch and yaw rotation speeds measured by the various rate gyros are zeroed;

Earth capture (if not captured since the start of phase (d)) by rotating the satellite about the apparent "pitch" axis in the opposite direction to the observed initial speed; immediately the Earth appears in the field of view of the sensor, the satellite is pointed in pitch at the Earth, and the reference star is searched for using the method described above for phase (b).

The latter two phases are not certain to succeed if the attitude of the satellite has been strongly disturbed. However, experience shows that the existence of a non-null kinetic moment about the Y axis in most cases prevents the roll and yaw angles from departing too far from their nominal value, in which case these phases will succeed; also, if the satellite has no kinetic moment, the maneuver is worth attempting because of the time savings that it represents if successful and because the probability of success is significant.

However, if the Earth is not captured in phases (c) and (d) after a given time (for example: 25 minutes) a conventional Sun acquisition mode is selected. Using the invention has then introduced an additional delay of only around 30 minutes, much less than the total time needed for Sun pointing followed by reacquisition of the nominal attitude.

The speed of this save mode results from the fact that it is easy to automate. The change from Sun pointing mode to the normal mode is difficult to automate because it requires a knowledge of the position of the satellite relative to the Earth and to the Sun. This position is usually calculated on the ground. As action is required from a satellite control station, the speed of reacquisition depends largely on the availability of the staff assigned to these operations.

To speed up attitude reacquisition, active control (and Earth and star "capture" consisting in reducing to zero the observed error) as used in the various phases listed above is implemented by powerful actuators such as thrusters (the orbit control thrusters, for example).

It goes without saying that the foregoing description has been given by way of non-limiting example only and that numerous variants thereof may be put forward by one skilled in the art without departing from the scope of the invention.

For example, Pole Star capture using the roll error for yaw control may be applied to a satellite stabilized by rotation about the Y axis. Pointing about the Z axis of the local orbital frame of reference of the Y axis of the satellite is based on information as to the depointing angle of the rotation axis Y around the X axis of the local orbital frame reference.

There is claimed:

1. An attitude reacquisition method for use on a satellite having stabilizing means about roll, yaw and pitch axes, said satellite being equipped with roll, pitch and yaw speed sensors, a terrestrial sensor, and a star sensor, said star sensor being adapted to sense a reference star of known position and magnitude, said attitude reacquisition method comprising the steps of;

(a) testing to determine if said terrestrial sensor is sensing the Earth, if said terrestrial sensor is sensing the Earth the result is positive, if not the result is negative;

(b) testing to determine if said star sensor is sensing a star of a magnitude approximately equal to said known magnitude of said reference star if said star sensor is sensing a star of a magnitude approximately equal to said reference star the result is positive, if not the result is negative;

(c) executing one of the following:
  (1) executing step (d), (e), and (f) if the result of step (a) is positive and the result of step (b) is positive;
  (2) executing step (g) if the result of step (a) is positive and the result of step (b) is negative;
  (3) executing steps (h) and (i) if the result of step (a) is negative and the result of step (b) is positive; and
  (4) executing steps (j) and (k) if the result of step (a) is negative and the result of step (b) is negative;

(d) controlling said satellite in at least one of said roll, yaw and pitch directions so that said terrestrial sensor senses the Earth and said star sensor senses said reference star;

(e) determining, simultaneously, a first roll position measurement from data obtained from said terrestrial sensor, and a second roll position measurement for data obtained from said star sensor; and (f) testing for consistency between said first roll position measurement and said second roll position measurement, if said first roll position measurement and said second roll position measurement remain consistent over time a normal attitude control mode is selected, if said first roll position measurement and said second roll position measurement do not remain consistent over time then perform step (g);

(g) rotating said satellite about said yaw axis until said star sensor is sensing said reference star, and repeat steps (d), (e) and (f);

(h) controlling said satellite in said roll and yaw directions to capture said sensed star;

(i) reversing said satellite's pitch rotation speed for a first predetermined time; and testing to determine if said terrestrial sensor is sensing the earth, and proceeding according to one of the following;
  (1) repeating steps (d), (e), and (f) if the result of said terrestrial sensor test of step (i) is positive; and
  (2) selecting sun acquisition mode if the result of said terrestrial sensor test of step (i) is not positive;

(j) cancelling the roll and yaw speeds; and
(k) reversing the pitch speeds for a predetermined time and proceeding according to one of the following;
  (1) performing steps (b) and (c) if the result of said terrestrial sensor test becomes positive; and
  (2) selecting sun acquisition mode if the result of said terrestrial sensor is not positive at the end of said predetermined time.

2. A method according to claim 1 wherein step (g) comprises the step of rotating said satellite about said yaw axis in a direction opposite to the direction of the detected initial speed.

3. A method according to claim 1 wherein said satellite has a kinetic moment near said pitch axis; and further comprising the step of rotating said satellite in a direction opposite to the direction of the roll error.

4. A method according to claim 1 wherein said rotating of said satellite is controlled by means of thrusters.

5. A method according to claim 1 wherein said reference star is less than 40° from a normal to the orbital plane of said satellite.

6. A method according to claim 1 wherein said reference star has a magnitude specific to it.

7. A method according to claim 1 wherein said reference star is the same throughout a mission of said satellite.

8. A method according to claim further comprising the step of selecting said reference star from a predetermined star group to suit an individual mission or the orientation of said satellite.

9. A method according to claim 8 wherein the reference star is selected in the NORTHERN hemisphere.

10. A method according to claim 9 further comprising the step of selecting the Pole Star as said reference star.

11. A method according to claim 8 wherein the reference star is selected in the SOUTHERN hemisphere.

12. A method according to claim 11 further comprising the step of selecting CANOPUS as said reference star.

13. A method according to claim 1 wherein said satellite is in an orbit inclined at not more than 15° to a plane of the Earth's equator.

14. A method according to claim 1 wherein said satellite is in a geosynchronous orbit.

15. A method according to claim 1 wherein said satellite is in a heliosynchronous orbit.

* * * * *

UNITED STATES PATENT AND TRADEMARK OFFICE
CERTIFICATE OF CORRECTION

PATENT NO. : 5,277,385
DATED : January 11, 1994
INVENTOR(S) : Patrick Flament

It is certified that error appears in the above-identified patent and that said Letters Patent is hereby corrected as shown below:

Title page, item [57], delete "*" before paragraphs.

Title page, item [57], first paragraph, delete "a." insert ---- a: ----.

Column 4, line 56, after "it" insert ---- ; ----.

Column 8, line 15, after "of" insert ---- : ----.

Column 8, line 22, after "star" insert ---- , ----.

Column 8, line 62, after "following" insert ---- : ----.

Column 9, line 4, after "lowing" insert ---- : ----.

Column 10, line 8, after "claim" insert ---- 1 ----.

Signed and Sealed this

Twenty-eighth Day of June, 1994

Attest:

BRUCE LEHMAN

*Attesting Officer*   *Commissioner of Patents and Trademarks*